United States Patent
Li et al.

(10) Patent No.: US 9,898,337 B2
(45) Date of Patent: Feb. 20, 2018

(54) DYNAMIC WORKLOAD DEPLOYMENT FOR DATA INTEGRATION SERVICES

(71) Applicant: International Business Machines Corporation, Armonk, NY (US)

(72) Inventors: Yong Li, Newton, MA (US); Jean-Claude Mamou, Millbury, MA (US); David T. Meeks, Ashland, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/670,881

(22) Filed: Mar. 27, 2015

(65) Prior Publication Data

US 2016/0283273 A1    Sep. 29, 2016

(51) Int. Cl.
*G06F 9/46* (2006.01)
*G06F 9/50* (2006.01)
(Continued)

(52) U.S. Cl.
CPC .......... *G06F 9/5011* (2013.01); *G06F 9/4881* (2013.01); *H04L 41/5029* (2013.01); *H04L 41/5051* (2013.01); *H04L 41/5096* (2013.01)

(58) Field of Classification Search
CPC .. G06F 9/5011; G06F 9/4881; H04L 41/5029; H04L 41/5051; H04L 41/5096
(Continued)

(56) References Cited

U.S. PATENT DOCUMENTS

| 6,314,425 B1* | 11/2001 | Serbinis | G06F 17/3089 |
| 8,249,960 B2* | 8/2012 | Cooper | G06F 21/6254 |
| | | | 705/34 |

(Continued)

FOREIGN PATENT DOCUMENTS

CN    103532981 A    1/2014

OTHER PUBLICATIONS

Espadas et al., "A tenant-based resource allocation model for scaling Software-as-a-Service applications over cloud computing infrastructures", Future Generation Computer Systems 29 (2013) 273-286, Elsevier, Available online: Oct. 29, 2011.
(Continued)

*Primary Examiner* — Camquy Truong
(74) *Attorney, Agent, or Firm* — Alexander G. Jochym; Maeve Carpenter

(57) ABSTRACT

An approach for deploying workload in a multi-tenancy computing environment is provided. The approach generates, by one or more computer processors, a tenant ID and a plan ID for a tenant based, at least in part, on a tenant registration request. The approach stores, by one or more computer processors, the tenant ID and the plan ID into a shared system record. The approach receives, by one or more computer processors, a request to update a first tenant service plan. The approach determines, by one or more computer processors, one or more resource pools supporting a second tenant service plan based at least in part, on an association between the tenant ID and the plan ID. The approach deploys, by one or more computer processors, one or more resources from the one or more resource pools supporting the second tenant service plan.

10 Claims, 6 Drawing Sheets

(51) Int. Cl.
*G06F 9/48* (2006.01)
*H04L 12/24* (2006.01)

(58) Field of Classification Search
USPC .......................................................... 718/104
See application file for complete search history.

(56) References Cited

U.S. PATENT DOCUMENTS

| | | |
|---|---|---|
| 8,577,795 B2 | 11/2013 | Clubb et al. |
| 8,639,008 B2 | 1/2014 | Suri |
| 8,762,997 B2 | 6/2014 | Moon et al. |
| 8,825,002 B2 | 9/2014 | Meyer et al. |
| 2010/0023949 A1 | 1/2010 | Jackson |
| 2011/0173626 A1 | 7/2011 | Chi et al. |
| 2014/0149494 A1 | 5/2014 | Markley et al. |
| 2014/0164598 A1 | 6/2014 | Srinivasan |
| 2014/0207740 A1 | 7/2014 | Narasayya et al. |
| 2014/0214496 A1 | 7/2014 | Macbeath et al. |
| 2014/0215590 A1 | 7/2014 | Brand |
| 2014/0280961 A1 | 9/2014 | Martinez et al. |
| 2014/0280970 A1 | 9/2014 | Pijewski et al. |
| 2014/0317617 A1 | 10/2014 | O'Donnell et al. |
| 2015/0269511 A1* | 9/2015 | Busayarat .......... G06Q 10/06315 705/7.25 |
| 2015/0370922 A1* | 12/2015 | Helfman ................ G06Q 20/02 705/40 |

OTHER PUBLICATIONS

Rochwerger et al., "The Reservoir model and architecture for open federated cloud computing", Copyright 2009 by International Business Machines Corporation, IBM J. Res. & Dev. vol. 53 No. 4 Paper 4 2009.
This reference is not provided because it is readily available to the Examiner.
List of IBM Patents or Patent Applications Treated as Related (Appendix P), filed Feb. 29, 2016.

* cited by examiner

DYNAMIC WORKLOAD DEPLOYMENT FOR DATA INTEGRATION SERVICES

BACKGROUND OF THE INVENTION

The present invention relates generally to data integration services, and more particularly to deploying data integration workload with multiple tenancy in a cloud deployment environment.

In a non-cloud environment, when data is migrated from one system to another, a user may export artifacts associated with a job from an old environment and import the artifacts into a new environment. This process may be repeated for each job within a project, and again for each project in the old environment.

In a cloud environment with a multi-tenancy configuration, each tenant may have a workspace that is similar to a traditional project. Multiple projects may coexist on the same virtual machine instance. When a tenant changes its state from a first plan to a second plan, a new workspace may be created with all related job artifacts in a new virtual machine instance that conforms to the second plan.

SUMMARY

Aspects of an embodiment of the present invention disclose a method, system, and computer program product for deploying workload in a multi-tenancy computing environment, in accordance with an embodiment of the present invention. The method includes generating, by one or more computer processors, a tenant ID and a plan ID for a tenant based, at least in part, on a tenant registration request. The method includes storing, by one or more computer processors, the tenant ID and the plan ID into a shared system record. The method includes receiving, by one or more computer processors, a request to update a first tenant service plan. The method includes determining, by one or more computer processors, one or more resource pools supporting a second tenant service plan based at least in part, on an association between the tenant ID and the plan ID. The method includes deploying, by one or more computer processors, one or more resources from the one or more resource pools supporting the second tenant service plan.

DETAILED DESCRIPTION

Figure 1:
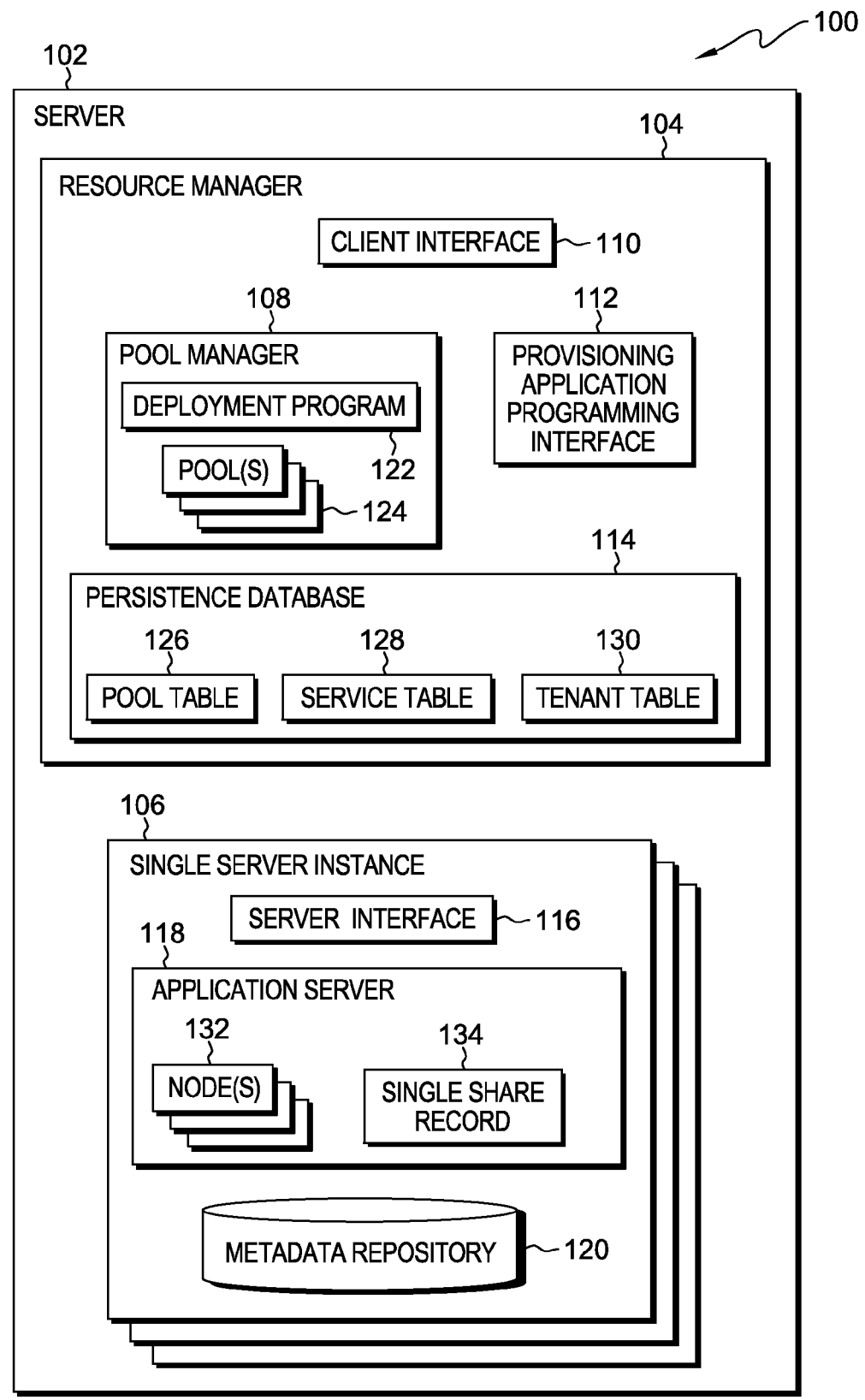
FIG. 1 is a functional block diagram illustrating a data processing environment, generally designated 100, in accordance with an embodiment of the present invention.

Embodiments of the present invention provide the capability to deploy workloads in a multi-tenancy computing environment utilizing a single shared system wide record. Embodiments of the present invention further provide the capability to associate tenants, pricing plans, and resource pooling within the single shared system wide record. Embodiments of the present invention further provide the capability to register and remove tenants, and deploy and migrate services using a single shared record to meet various data integration needs.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise of copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the invention. The terminology used herein is chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes a server 102.

In the exemplary embodiment, server 102 is a server capable of supporting dynamic workload deployment for data integration services in a multi-tenancy computing environment. In one embodiment, server 102 may be, for example, a server computer system such as a management server, web server, or any other electronic device or computing system capable of sending and receiving data. In another embodiment, server 102 may be a data center, consisting of a collection of networks and servers providing an IT service, such as virtual servers and applications deployed on virtual servers, to an external party. In another embodiment, server 102 represents a "cloud" of computers interconnected by one or more networks, where server 102 is a computing system utilizing clustered computers and components to act as a single pool of seamless resources when accessed through a network (not shown). This is a common implementation for data centers in addition to cloud computing applications. Server 102 includes resource manager 104 and single server instance 106.

In the exemplary embodiment, resource manager 104 is a software-based component capable of managing resources in a multi-tenancy cloud computing environment. In one embodiment, resource manager 104 handles tenant onboarding and de-boarding processes. In another embodiment, resource manager 104 provides the capability for virtual machine pool management. In another embodiment, resource manager 104 provides the capability to handle pool state management. In the exemplary embodiment, resource manager 104 includes pool manager 108, client interface 110, provisioning application programming interface 112, and persistence database 114.

In the exemplary embodiment, pool manager 108 is a software-based component capable of managing one or more pools, such as pool(s) 124. In one embodiment, pool(s) 124 includes a designated pool (i.e., a pool including one or more dedicated virtual machines provisioned to a designated client, such as a company, a single user, etc.), an active pool (i.e., a pool including one or more shared virtual machines provisioned to a plurality of clients), an available pool (i.e., a pool including one or more virtual machines ready for provisioning to one or more clients), and an in-process pool (i.e., a pool including one or more virtual machines being prepared for provisioning). In the exemplary embodiment, pool manager 108 includes deployment program 122.

In the exemplary embodiment, deployment program 122 is a software-based component for dynamic workload deployment and multi-tenancy management. In the exemplary embodiment, deployment program 122 provides the capability to create, deploy, and migrate service instances based, at least in part, on a service plan, a pricing plan, and a plurality of multi-tenancy requirements. In one embodiment, deployment program 122 provides the capability to register and provision one or more tenants within a multi-tenancy computing environment. In another embodiment, deployment program 122 provides the capability to remove one or more tenants within a multi-tenancy computing environment. In yet another embodiment, deployment program 122 provides the capability to update a pricing plan and a service plan for one or more tenants within a multi-tenancy computing environment. In one embodiment, deployment program 122 associates multi-tenancy with various service plans and pricing plans, and, responsive to a change in a tenant's pricing plan or service plan, deploys workloads associated with the tenant into one or more pools, such as pool(s) 124, associated with a particular pricing plan and service plan. In another embodiment, deployment program 122 may be implemented by one or more application program interfaces (APIs) (not shown), such that dynamic workload deployment and multi-tenancy management may be realized through various programs that may be fully integrated, partially integrated, or separate from deployment program 122. Various aspects covered by the capabilities of deployment program 122 are discussed in further detail in with reference to Figures. In the subsequent Figures, while each flowchart represents an aspect of deployment program 122, the aspects are covered by the capabilities provided by deployment program 122.

In the exemplary embodiment, client interface 110 is a conventional user interface providing a client (not shown) with the capability to communicate with a resource manager, such as resource manager 104, a pool manager, such as pool manager 108, and a deployment program, such as deployment program 122. In one embodiment, client interface 110 refers to the information (such as graphic, text, and sound) a program presents to a client and the control sequences the client employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In the exemplary embodiment, provisioning application programming interface 112 is a conventional software interface providing a software-based component with the capability to interact with one or more computer resources, such as memory, computer processing unit, storage, etc. In one embodiment, provisioning application programming interface 112 provides a resource manager, such as resource manager 104, with the capability to interact with one or more server instances (i.e., virtual machines), such as single server instance 106 to deploy data integration workload in a multi-tenancy computing environment.

In the exemplary embodiment, persistence database 114 is a conventional persistence database for storing information (i.e., state). In the exemplary embodiment, deployment program 122 of pool manager 108 stores pool information, service plan information, and tenant information within persistence database 114 in one or more designated tables, such as pool table 126, service table 128, and tenant table 130, respectively.

In one embodiment, pool table 126 includes information relating to one or more resources (i.e., virtual machine instance, application server, single server instance, etc.) associated with a pool, such as pool(s) 124. In one embodiment, pool table 126 includes associations between a service plan and a pool, such as pool(s) 124. For example, pool table 126 may include associations between a pool ID (e.g., an identifier for a particular pool), a pool type (e.g., designated, dedicated, shared, general, etc.), and a plan ID (i.e., an identifier for a particular service plan and an associated pricing plan), such that a particular plan ID associated with a particular pool ID indicates a particular pool type capable of supporting a particular service plan.

In one embodiment, service table 128 includes information related to one or more service plans, such as a shared service plan and a dedicated service plan, where the one or more service plans, and pricing associated with each of the one or more service plans, such as a free shared multi-tenant pricing plan, a standard shared multi-tenant pricing plan, a premium shared multi-tenant pricing plan, a standard dedicated pricing plan, and a premium dedicated pricing plan, etc., are identified by a plan ID (i.e., an identifier for a particular service plan and associated pricing plan).

In one embodiment, tenant table 130 includes information related to one or more tenants in a multi-tenancy computing environment, such as a tenant ID (i.e., a tenant identifier), and a plan ID associated with each of the one or more tenants, such as a shared service plan and a dedicated service plan. In one embodiment, the plan ID includes one or more service plan attributes. For example, a shared service plan with a free shared multi-tenant pricing plan may have one or more service plan attributes (i.e., specifications), such as a limit of one node, such as node(s) 132, and a limit of one partition.

In the exemplary embodiment, single server instance 106 is a traditional virtual machine instance in a multi-tenancy computing environment, where a traditional virtual machine instance is an emulation of a particular computer system. Traditional virtual machine operation is based on the computer architecture and functions of a real or hypothetical computer, and their implementations can involve specialized hardware, software, or a combination of both. In one embodiment, single server instance 106 may be a single logic information server instance where a deployment program of a pool manager, such as deployment program 122 of pool manager 108, deploys tenant workloads in accordance with a service plan and a pricing plan. In another embodiment, single server instance 106 may be a virtual machine in a hypervisor-based environment, where a hypervisor is a piece of computer software, firmware, or hardware that is capable of creating and operating one or more virtual machines. A type 1 hypervisor is a native, bare metal hypervisor that operates directly on a host computer's hardware to control the hardware and manage guest operating systems. A type 2 hypervisor is a hypervisor that operates within a conventional operating system environment (i.e., hosted) as a distinct software layer to manage guest operating systems. In one embodiment, single server instance 106 may consist of a virtual machine monitor on top of a host operating system that provides a full abstraction of single server instance 106, such that single service instance 106 has its own operating system that executes completely isolated from one or more other virtual machines, allowing for execution of multiple different operating systems on a single host. In one embodiment, single service instance 106 represents a plurality of single service instances (i.e., virtual machine instances). In the exemplary embodiment, single server instance 106 includes server interface 116, application server 118, and metadata repository 120.

In the exemplary embodiment, server interface 116 is a conventional interface providing a deployment program, such as deployment program 122 of pool manager 108 with the capability to interact with application server 118 for deploying workload when a tenant changes from a first service plan to a second service plan, or changes from a first pricing plan for a service plan to a second pricing plan for the service plan.

In the exemplary embodiment, application server 118 is a conventional application server cluster in a multi-tenancy computing environment. In one embodiment, application server 118 is a layer of a multi-tenancy computing environment where workloads are deployed across node(s) 132. In the exemplary embodiment, application server 118 includes single share record 134 for storing information including, without limitation, tenant information (e.g., registration information), tenant activity, tenant requests, run-time activity, and service plan information associated with a tenant, etc., in a shared system record to provide on-demand data integration service. In one embodiment, single share record 134 includes, but not limited to, dependencies, job activity, and job artifacts, where the job artifacts include design information about a data source, a data target, and data transformation logic, etc. In one embodiment, single share record 134 exclusively stores the aforementioned information in a common repository, such as metadata repository 120. In one embodiment, single share record 134 stores information from persistence database 114, such as pool table 126, service table 128, and tenant table 130, as well as various associations between one or more tenants, one or more resource pools, and one or more service plans.

In the exemplary embodiment, metadata repository 120 is a conventional database for storing information related to workload deployment in a multi-tenancy computing environment. In one embodiment, metadata repository 120 stores information including, but not limited to, job artifacts for a tenant and projects for a tenant.

Figure 2:
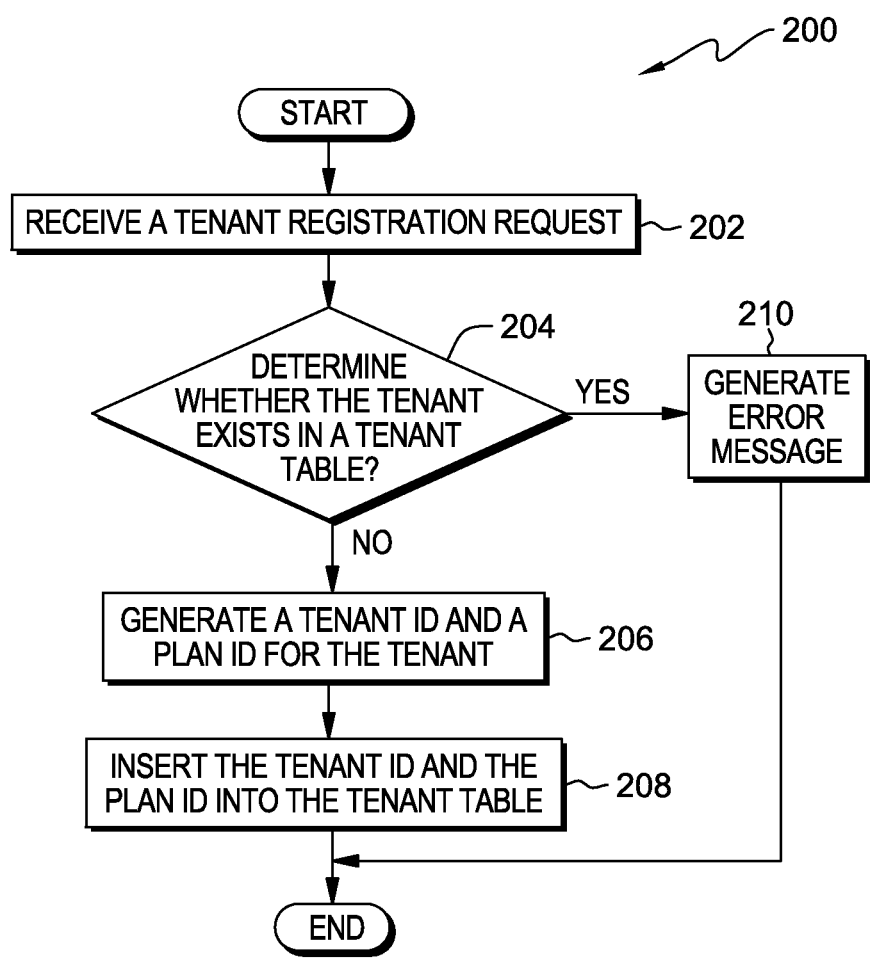
FIG. 2 is a flowchart depicting steps of a deployment program, generally designated 200, for provisioning a new tenant in a multiple tenancy system, in accordance with an embodiment of the present invention.

FIG. 2 is a flowchart depicting steps of a deployment program, such as deployment program 122, generally designated 200, for provisioning a new tenant in a multiple tenancy system, in accordance with an embodiment of the present invention.

Deployment program 122 receives a tenant registration request (202). In the exemplary embodiment, deployment program 122 receives a tenant registration request from a client via a client interface, such as client interface 110. In one embodiment, the tenant registration request includes tenant information, where tenant information includes, without limitation, a tenant identifier, a workspace identifier, a workstation identifier, and a company or organization identifier, etc. In another embodiment, the tenant registration request includes service plan information, such as a type of service plan requested, and a pricing plan for the type of service plan requested, etc.

Deployment program 122 determines whether the tenant exists in a tenant table (204). In the exemplary embodiment, deployment program 122 determines whether the tenant exists in a tenant table, such as tenant table 130 in persistence database 114, by extracting one or more identifiers from the tenant registration request, and searching tenant table 130 for tenant information matching the one or more identifiers. For example, deployment program 122 extracts an identifier, such as a client name, a company name, and an organization name, etc., from a tenant registration request and searches tenant table 130 for a tenant identifier matching the identifier. In one embodiment, where no tenant information in the tenant table matches the one or more identifiers, deployment program 122 determines that the tenant does not exist in the tenant table. In one embodiment, where tenant information matches the one or more identifiers, deployment program 122 determines that the tenant exists in the tenant table.

Responsive to a determination that the tenant exists in the tenant table (YES branch, 204), deployment program 122 generates an error message (210). In the exemplary embodiment, deployment program 122 generates an error message, such as "Error, duplicate tenantID", and notifies a client of error by displaying the error message via a client interface, such as client interface 110. In one embodiment, deployment program 122 may return existing tenant information for the duplicate tenantID to a client via a client interface, such as client interface 110, instead of generating an error message.

Responsive to a determination that the tenant does not exist in the tenant table (NO branch, 204), deployment program 122 generates a tenant ID and a plan ID for the tenant (206). In the exemplary embodiment, deployment program 122 generates a tenant ID and a plan ID for the tenant based, at least in part, on information included in the tenant registration request, such as a tenant identifier and a service plan identifier. In one embodiment, deployment program 122 may utilize information from the tenant registration request to broker a tenant ID and plan ID based on client information and client requirements provided in the tenant registration request. For example, where a tenant registration request includes client information, such as an organization name, for example "Tree Hill", and client requirements including a type of service plan and a pricing plan for the type of service plan, such as a shared multi-tenancy service plan and a premium pricing plan, deployment program 122 may generate a tenant ID, such as "TreeHillID", and a plan ID, such as "premiumsharedID", such that the tenant ID and the plan ID identify the tenant and the type of service plan and the pricing plan associated with the tenant.

Deployment program 122 inserts the tenant ID and the plan ID into the tenant table (208). In the exemplary embodiment, deployment program 122 inserts the tenant ID and the plan ID for the newly created tenant into the tenant table by storing a tenant ID and plan ID association, such as {TreeHillID, premiumsharedID}, into the tenant table, such as tenant table 130 of persistence database 114. In another embodiment, the tenant ID and plan ID association may be stored in one or more additional databases, such as metadata repository 120. In yet another embodiment, the tenant ID and plan ID association may be stored on one or more additional servers, where the one or more additional servers may be one or more virtual machine instances. For example, deployment program 122 may store a tenant ID and plan ID association in a single shared system wide record on a server, such as single share record 134 of application server 118. In one embodiment, storing the tenant ID and plan ID association into the tenant table completes the registration of the tenant. In one embodiment, deployment program 122 generates a registration confirmation and notifies the tenant via a client interface, such as client interface 110.

Figure 3:
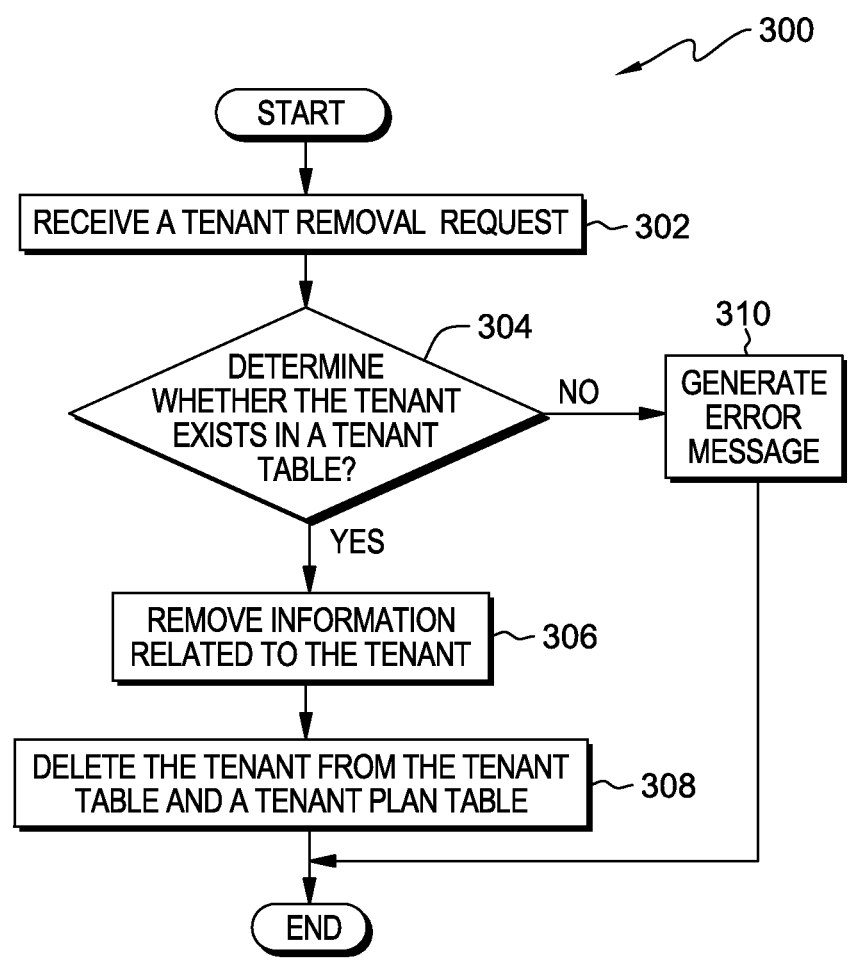
FIG. 3 is a flowchart depicting steps of a deployment program, generally designated 300, for removing an existing tenant in a multiple tenancy system, in accordance with an embodiment of the present invention.

FIG. 3 is a flowchart depicting steps of a deployment program, generally designated 300, for removing an existing tenant in a multiple tenancy system, in accordance with an embodiment of the present invention.

Deployment program 122 receives a tenant removal request (302). In the exemplary embodiment, deployment program 122 receives a tenant removal request from an existing tenant via a client interface, such as client interface 110. In one embodiment, the tenant removal request includes tenant information, including, but not limited to, a tenant ID. In one embodiment, the tenant removal request provides a tenant with the capability to request that related tenant information (a tenant ID, a plan ID, a job artifact, a workspace, a project, etc.) be removed from the multi-tenancy computing environment. For example, where a tenant no longer wishes to utilize a multi-tenancy computing, the tenant may request that related tenant information be removed from the multi-tenancy computing environment by submitting a tenant removal request via a client interface, such as client interface 110.

Deployment program 122 determines whether the tenant exists in a tenant table (304). In the exemplary embodiment, deployment program 122 determines whether the tenant exists in a tenant table, such as tenant table 130 in persistence database 114, by extracting one or more tenant identifiers from the tenant removal request, and searching tenant table 130 for tenant information matching the one or more tenant identifiers. For example, deployment program 122 extracts a tenant identifier, such as a tenant ID, from a tenant removal request and searches tenant table 130 for a tenant ID matching the tenant identifier. In one embodiment, where no tenant information in the tenant table matches the one or more tenant identifiers, deployment program 122 determines that the tenant does not exist in the tenant table. In one embodiment, where tenant information matches the one or more tenant identifiers, deployment program 122 determines that the tenant exists in the tenant table.

Responsive to a determination that the tenant does not exist in the tenant table (NO branch, 304), deployment program 122 generates an error message (310). In the exemplary embodiment, deployment program 122 generates an error message, such as "Error, tenantID does not exist", and notifies a tenant of error by displaying the error message via a client interface, such as client interface 110.

Responsive to a determination that the tenant exists in the tenant table (YES branch, 304), deployment program 122 removes information related to the tenant (306). In the exemplary embodiment, deployment program 122 removes information related to the tenant including, without limitation, one or more data files and one or more scratch files, one or more job artifacts, and one or more projects, etc. In one embodiment, deployment program 122 performs a cleanup of a plurality of data files associated with the tenant. In one embodiment, deployment program 122 performs a cleanup of a plurality of runtime artifacts and design time artifacts associated with the tenant.

Deployment program 122 deletes the tenant from the tenant table and a tenant plan table (308). In the exemplary embodiment, deployment program 122 deletes the tenant from the tenant table, such as tenant table 130, and a tenant plan table, such as service table 128, by removing the tenant ID and plan ID from the tenant table and the tenant plan table, respectively. In one embodiment, deployment program 122 removes tenant ID and plan ID associations (i.e., tenant, service plan, and pricing plan associations) from tenant table 130 and service table 128. In one embodiment, removing the tenant ID and plan ID associations from tenant table 130 and service table 128 completes the removal of the tenant. In one embodiment, deployment program 122 generates a removal confirmation and notifies the client via a client interface, such as client interface 110.

Figure 4:
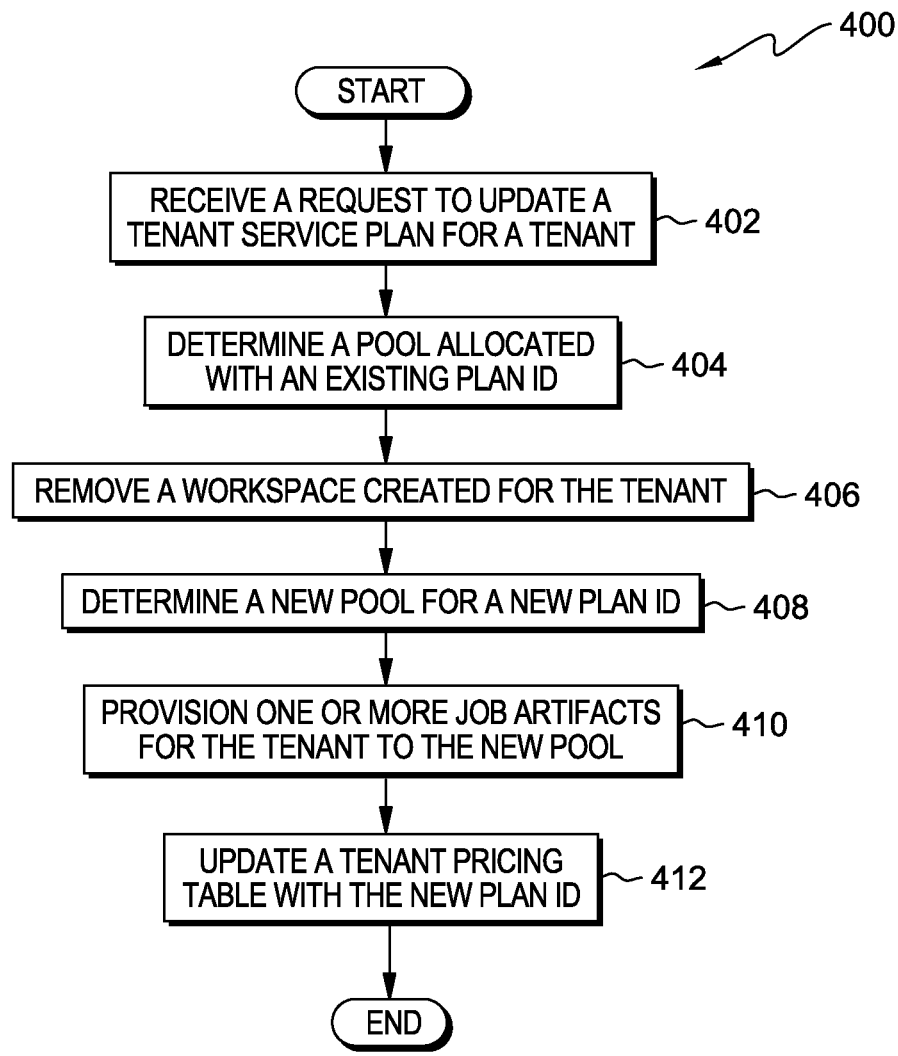
FIG. 4 is a flowchart depicting steps of a deployment program, generally designated 400, for updating a service plan for a tenant in a multiple tenancy system, in accordance with an embodiment of the present invention.

FIG. 4 is a flowchart depicting steps of a deployment program, generally designated 400, for updating a service plan for a tenant in a multiple tenancy system, in accordance with an embodiment of the present invention.

Deployment program 122 receives a request to update a tenant service plan for a tenant (402). In the exemplary embodiment, deployment program 122 receives a request to update a tenant service plan for a tenant from a client via a client interface, such as client interface 110. In one embodiment, the request to update a tenant service plan includes a tenant ID (i.e., a tenant identifier) and new service plan information, where new service plan information includes one or more of a type of new service plan requested (e.g., move from a shared service plan to a dedicated service plan), an update to an existing service plan (e.g., upgrade to a premium pricing plan from a free plan for an existing shared service plan), and a revision to an existing service plan (e.g., move from a first shared resource pool to a second shared resource pool). For example, an existing tenant "Customer" originally registered for a shared multi-tenant service plan at a free pricing plan, and now desires to upgrade to a dedicated service plan at a premium pricing plan. Deployment program 122 may receive a request to update the tenant service plan for "Customer", where the request to update the tenant service plan includes a tenant ID, such as "CustomerID", and the new type of service plan requested, such as a dedicated service plan at a premium pricing plan. In one embodiment, the request to update a tenant service plan may include a plan ID of an existing service plan and a plan ID for the new type of service plan requested.

Deployment program 122 determines a pool allocated with an existing plan ID (404). In the exemplary embodiment, deployment program 122 determines a pool, such as pool(s) 124 allocated with a first plan ID associated with the tenant ID included in the request to update a tenant service plan. In one embodiment, deployment program 122 determines a pool allocated with the first plan ID by retrieving a tenant ID and plan ID association from a tenant table, such as tenant table 130 in persistence database 114, and retrieving a plan ID and pool association from a service table, such as service table 128 in persistence database 114. For example, a tenant ID in a tenant table, such as tenant table 130, may be associated with a plan ID in a service table, such as service table 128, and the plan ID in service table 128 may associated with one or more resource pools, such as pool(s) 124, in a pool table, such as pool table 126. In one embodiment, deployment program 122 utilizes the tenant-service-pool associations stored in a single shared system wide record, such as single share record 134, to determine a pool allocated with the existing plan ID.

Deployment program 122 removes a workspace created for the tenant (406). In the exemplary embodiment, deployment program 122 removes a workspace created for the tenant for the first plan ID from the pool, such as pool(s) 124, allocated with the existing plan ID. In one embodiment, deployment program 122 removes one or more resource instances (i.e., virtual machines) from the pool. In some embodiments, for example where a dedicated pool associated with an existing plan is located on a first data center, and a new dedicated pool associated with a new plan is on a second data center, deployment program 122 may funnel through different networks to perform cleanup of job artifacts associated with the existing plan ID.

Deployment program 122 determines a new pool for a new plan ID (408). In the exemplary embodiment, deployment program 122 determines a new pool for a second plan ID by utilizing service plan and pricing plan associations to determine a new pool, such as pool(s) 124 that supports the second service plan requested and the pricing plan associated with the second service plan. For example, where a new plan ID indicates a tenant wishes to update to a dedicated service plan in a premium pricing plan, deployment program 122 determines a new pool from a pool table, such as a premium dedicated pool from pool table 126 in persistence database 114, that includes one or more resources (i.e., virtual machines) supporting a dedicated service plan in a premium pricing plan. In one embodiment, the one or more resources are virtual machine instances, such as single server instance 106, assigned to one or more pools, such a pool(s) 124.

Deployment program 122 provisions one or more job artifacts for the tenant to the new pool (410). In the exemplary embodiment, deployment program 122 provisions one or more job artifacts to the new pool by determining a plurality of virtual machines related to the new pool, and deploying job artifacts from a metadata repository, such as metadata repository 120 to each of the plurality of virtual machines allocated in the new pool. In some embodiments, for example where a dedicated pool associated with an existing plan is located on a first data center, and a new dedicated pool associated with a new plan is on a second data center, deployment program 122 may funnel through different networks to deploy job artifacts associated with the new plan ID.

Deployment program 122 updates a tenant table with the new plan ID (412). In the exemplary embodiment, deployment program 122 updates a tenant table, such as tenant table 130 in persistence database 114, with the new plan ID to reflect the new plan assignment, as well as the new tenant-service-pool associations.

Figure 5:
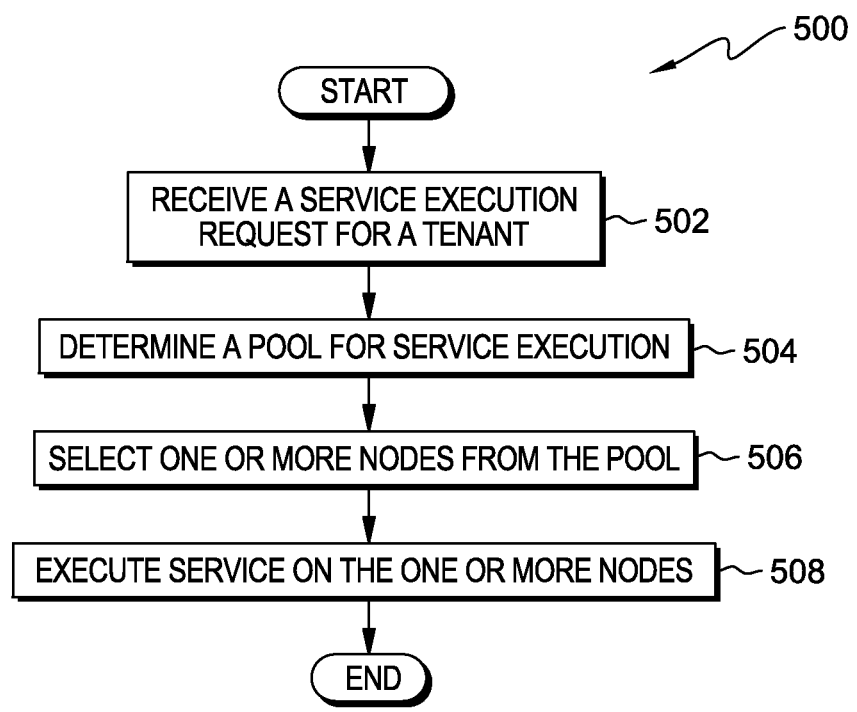
FIG. 5 is a flowchart depicting steps of a deployment program, generally designated 500, for service execution in a multiple tenancy system, in accordance with an embodiment of the present invention.

FIG. 5 is a flowchart depicting steps of a deployment program, generally designated 500, for service execution in a multiple tenancy system, in accordance with an embodiment of the present invention.

Deployment program 122 receives a service execution request for a tenant (502). In the exemplary embodiment, deployment program 122 receives a service execution request for a tenant, where the service execution request includes at least a tenant ID.

Deployment program 122 determines a pool for service execution (504). In the exemplary embodiment, deployment program 122 determines a pool for service execution by utilizing the tenant ID to look up a pool, such as pool(s) 124, associated with the service execution (i.e., execution of the specifications of a service plan) for a service plan (i.e., plan ID) associated with the tenant ID.

Deployment program 122 selects one or more nodes from the pool (506). In the exemplary embodiment, deployment program 122 selects one or more nodes, such as node(s) 132 from the pool, such as pool(s) 124, for service execution. For example, where a pool associated with a plan ID, such as a premium dedicated pool associated with a dedicated service plan at premium pricing, includes 100 nodes available, and the plan attributes allow for usage of 50 nodes, deployment program 122 selects 50 of the 100 nodes for service execution.

Deployment program 122 executes service on the one or more nodes (508). In the exemplary embodiment, deployment program 122 executes service on the one or more nodes, such as node(s) 132, selected based, at least in part, on the specifications (i.e., attributes) for the plan ID. For example, when a tenant registers for a free service plan, the specifications for the plan ID may include corresponding attributes, such as a one node limit and a one partition limit within the pool, such that deployment program 122 executes a one partition job on a one selected node.

Figure 6:
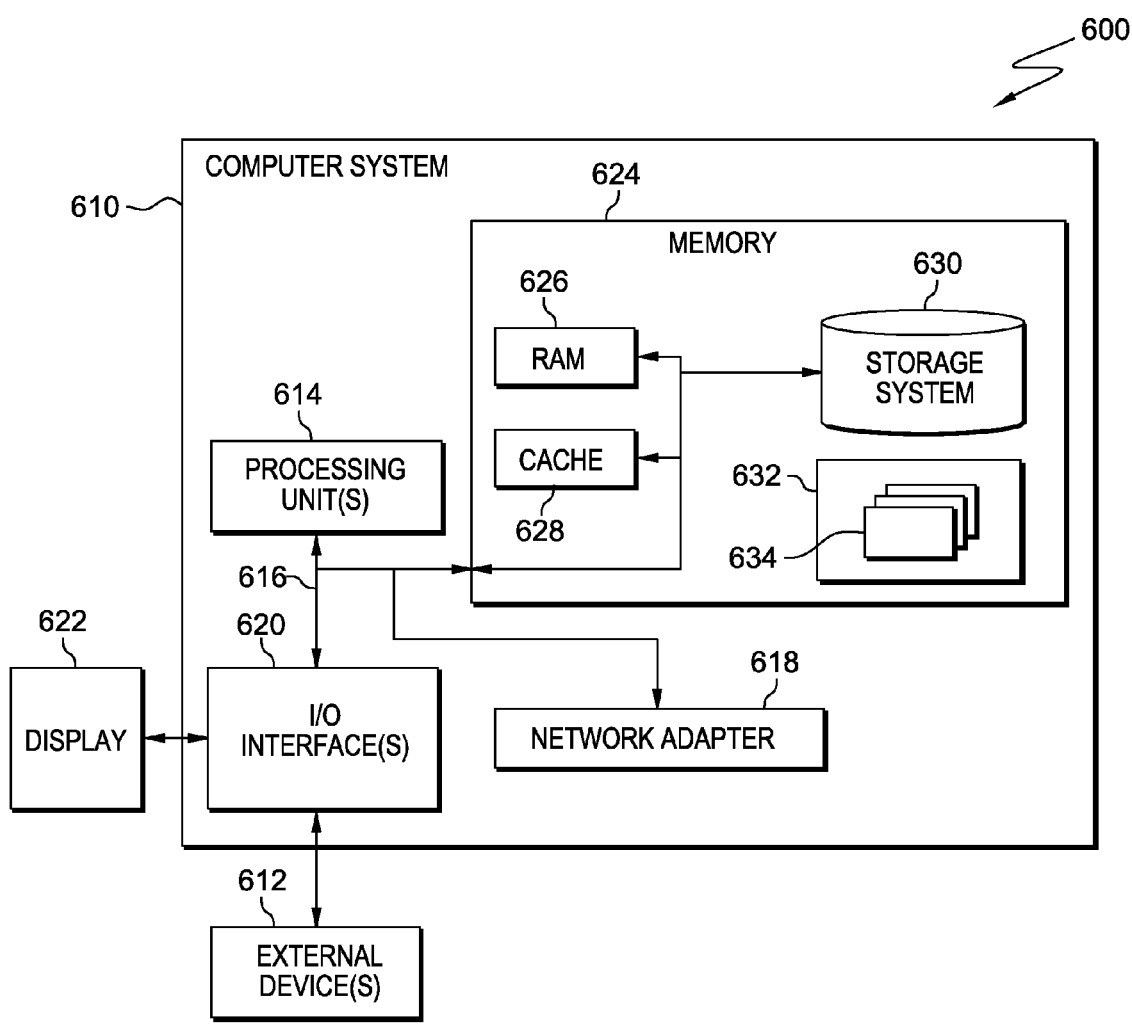
FIG. 6 is a block diagram depicting components of a data processing system (such as the server of FIG. 1), generally designated 600, in accordance with an embodiment of the present invention.

FIG. 6 depicts a block diagram of components of a data processing system, generally designated 600, in data processing environment 100, such as server 102 in accordance with an illustrative embodiment of the present invention. It should be appreciated that FIG. 6 provides only an illustration of one implementation and does not imply any limitations with regard to the environments in that different embodiments may be implemented. Many modifications to the depicted environment can be made. In an embodiment, data processing system 600 is a cloud computing node, and is only one example of a suitable cloud computing node and is not intended to suggest any limitation as to the scope of use or functionality of embodiments of the invention described herein. Regardless, data processing system 600 is capable of being implemented and/or performing any of the functionality set forth hereinabove.

In the illustrative embodiment, server 102 in data processing environment 100 is shown in the form of a general-purpose computing device, such as computer system 610. The components of computer system 610 may include, but are not limited to, one or more processors or processing unit(s) 614, memory 624, and bus 616 that couples various system components including memory 624 to processing unit(s) 614. Computer system 610 may be described in the general context of computer system-executable instructions, such as program modules, being executed by a computer system. Generally, program modules may include routines, programs, objects, components, logic, data structures, and so on that perform particular tasks or implement particular abstract data types. Computer system 610 may be practiced in distributed cloud computing environments where tasks are performed by remote processing devices that are linked through a communications network. In a distributed cloud computing environment, program modules may be located in both local and remote computing system storage media including memory storage devices.

Bus 616 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 610 typically includes a variety of computer system readable media. Such media may be any available media that is accessible by computer system 610, and it includes both volatile and non-volatile media, removable and non-removable media.

Memory 624 can include computer system readable media in the form of volatile memory, such as random access memory (RAM) 626 and/or cache memory 628. Computer system 610 may further include other removable/non-removable, volatile/non-volatile computer system storage media. By way of example only, storage system 630 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 616 by one or more data media interfaces. As will be further depicted and described below, memory 624 may include at least one computer program product having a set (e.g., at least one) of program modules that are configured to carry out the functions of embodiments of the invention.

Program/utility 632, having one or more sets of program modules 634, may be stored in memory 624 by way of example, and not limitation, as well as an operating system, one or more application programs, other program modules, and program data. Each of the operating systems, one or more application programs, other program modules, and program data, or some combination thereof, may include an implementation of a networking environment. Program modules 634 generally carry out the functions and/or methodologies of embodiments of the invention as described herein. Computer system 610 may also communicate with one or more external device(s) 612 such as a keyboard, a pointing device, a display 622, etc., or one or more devices that enable a user to interact with computer system 610 and any devices (e.g., network card, modem, etc.) that enable computer system 610 to communicate with one or more other computing devices. Such communication can occur via Input/Output (I/O) interface(s) 620. Still yet, computer system 610 can communicate with one or more networks such as a local area network (LAN), a general wide area network (WAN), and/or a public network (e.g., the Internet) via network adapter 618. As depicted, network adapter 418 communicates with the other components of computer system 610 via bus 616. It should be understood that although not shown, other hardware and software components, such as microcode, device drivers, redundant processing units, external disk drive arrays, RAID systems, tape drives, and data archival storage systems may be used in conjunction with computer system 610.

What is claimed is:

1. A computer program product for deploying workload in a multi-tenancy computing environment, the computer program product comprising:
one or more computer readable storage media and program instructions stored on the one or more computer readable storage media, the program instructions comprising:
program instructions to generate, by one or more computer processors, a tenant ID and a plan ID for a tenant based, at least in part, on a tenant registration request;
program instructions to store, by one or more computer processors, the tenant ID and the plan ID into a shared system record;
program instructions to receive, by one or more computer processors, a request to update a first tenant service plan;
program instructions to determine, by one or more computer processors, one or more resource pools supporting a second tenant service plan based at least in part, on an association between the tenant ID and the plan ID;
program instructions to deploy, by one or more computer processors, one or more resources from the one or more resource pools supporting the second tenant service plan; and
program instructions to determine, by one or more computer processors, a pool for supporting a new service plan requested based, at least in part, on a type of service plan and a pricing plan associated with the type of service plan;
wherein the type of service plan includes a shared service plan and a dedicated service plan; and
wherein the pricing plan associated with the type of service plan includes a free pricing plan.

2. The computer program product of claim 1, wherein program instructions to generate a tenant ID and a plan ID, further comprises:
program instructions to determine, by one or more computer processors, whether a tenant exists in a tenant table, wherein said determining includes extracting one or more tenant identifiers from the tenant registration request and searching the tenant table for information matching at least one of the one or more tenant identifiers; and
responsive to a determination that no information in the tenant table matches at least one of the one or more tenant identifiers, program instructions to determine, by one or more computer processors, that the tenant does not exist in the tenant table.

3. The computer program product of claim 1, wherein program instructions to store the tenant ID and the plan ID into a shared system record, further comprises:
program instructions to associate, by one or more computer processors, the tenant ID with the plan ID in a database;
program instructions to store, by one or more computer processors, the plan ID in a service table, wherein storing includes associating the plan ID with the one or more resource pools; and
program instructions to store, by one or more computer processors, the one or more resource pools in a pool table.

4. The computer program product of claim 1, wherein the request to update a tenant service plan includes one or more of a tenant ID and a type of service plan requested.

5. The computer program product of claim 1, wherein program instructions to determine one or more resource pools supporting a second tenant service plan, further comprises:
program instructions to determine, by one or more computer processors, a resource pool allocated to a first plan ID associated with a tenant ID from the request to update the tenant service plan.

6. The computer program product of claim 5, wherein determining a resource pool allocated to a first plan ID associated with a tenant ID from the request to update the tenant service plan, further comprises:
program instructions to retrieve, by one or more computer processors, the plan ID associated with the tenant ID from a database; and
program instructions to retrieve, by one or more computer processors, a resource pool associated with the plan ID from a database, where the resource pool associated with the plan ID indicates a resource allocated to the plan ID.

7. A computer system for deploying workload in a multi-tenancy computing environment, the computer system comprising:
one or more computer readable storage media;
program instructions stored on at least one of the one or more computer readable storage media for execution by at least one of the one or more computer processors, the program instructions comprising:
program instructions to generate, by one or more computer processors, a tenant ID and a plan ID for a tenant based, at least in part, on a tenant registration request;
program instructions to store, by one or more computer processors, the tenant ID and the plan ID into a shared system record;

program instructions to receive, by one or more computer processors, a request to update a first tenant service plan;

program instructions to determine, by one or more computer processors, one or more resource pools supporting a second tenant service plan based at least in part, on an association between the tenant ID and the plan ID;

program instructions to deploy, by one or more computer processors, one or more resources from the one or more resource pools supporting the second tenant service plan; and program instructions to determine, by one or more computer processors, a pool for supporting a new service plan requested based, at least in part, on a type of service plan and a pricing plan associated with the type of service plan;

wherein the type of service plan includes a shared service plan and a dedicated service plan; and wherein the pricing plan associated with the type of service plan includes a free pricing plan.

8. The computer system of claim 7, wherein program instructions to deploy one or more resources from the one or more resource pools supporting the second tenant service plan, further comprises:

program instructions to determine, by one or more computer processors, a plurality of virtual machines allocated to the one or more resource pools; and provisioning, by one or more computer processors; one or more job artifacts to the plurality of virtual machines allocated to the one or more resource pools.

9. The computer system of claim 7, wherein program instructions to determine one or more resource pools supporting a second tenant service plan, further comprises:

program instructions to determine, by one or more computer processors, a resource pool allocated to a first plan ID associated with a tenant ID from the request to update the tenant service plan.

10. The computer system of claim 9, wherein program instructions to determine a resource pool allocated to a first plan ID associated with a tenant ID from the request to update the tenant service plan, further comprises:

program instructions to retrieve, by one or more computer processors, the plan ID associated with the tenant ID from a database; and retrieving, by one or more computer processors, a resource pool associated with the plan ID from a database, where the resource pool associated with the plan ID indicates a resource allocated to the plan ID.

* * * * *